M. F. WEINRICH.
MEASURING INSTRUMENT.
APPLICATION FILED AUG. 6, 1915.

1,258,284.

Patented Mar. 5, 1918.
2 SHEETS—SHEET 1.

Inventor
Morris F. Weinrich
By P. Walter Fowler
Attorney

Witness

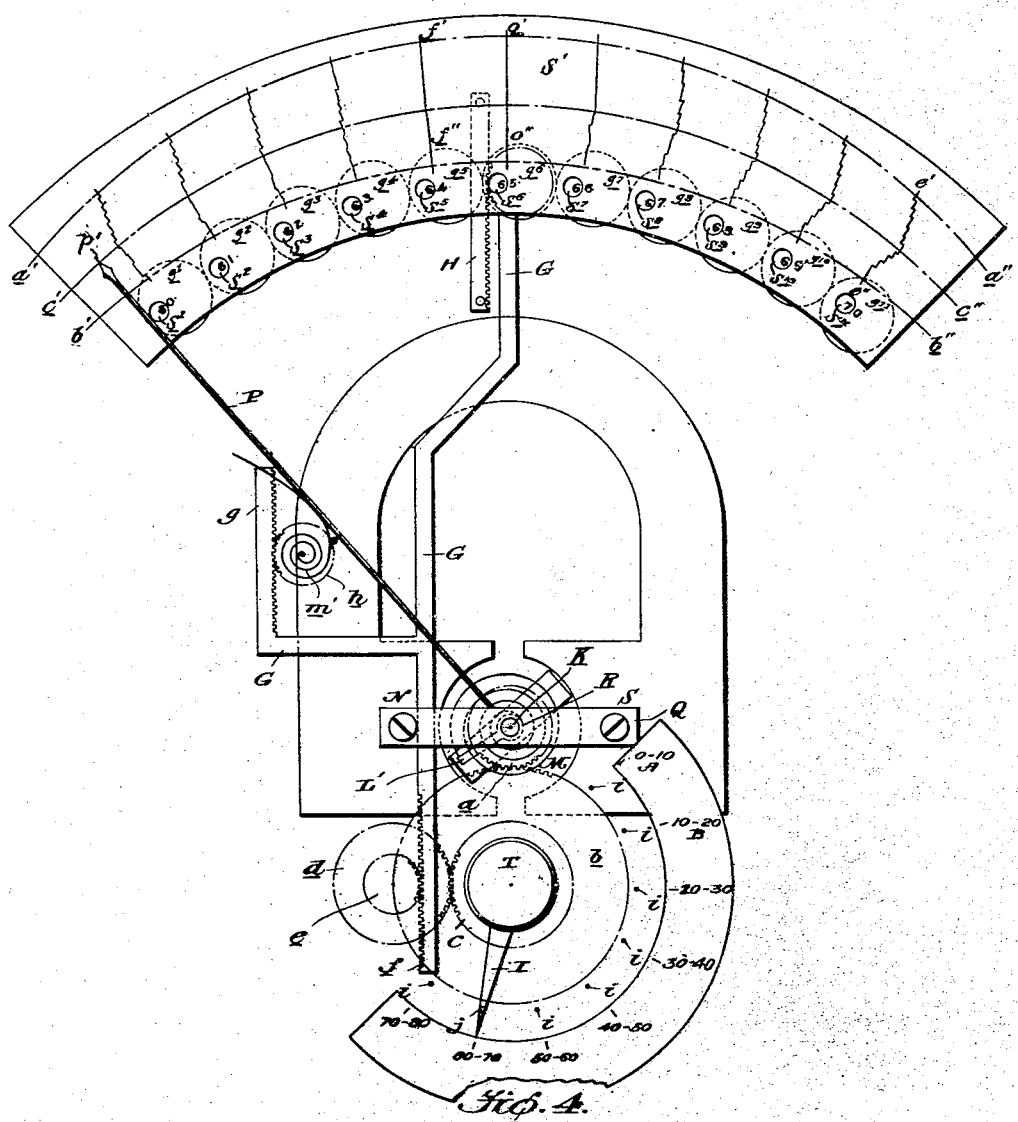

UNITED STATES PATENT OFFICE.

MORRIS FRANCIS WEINRICH, OF NEW YORK, N. Y.

MEASURING INSTRUMENT.

1,258,284.   Specification of Letters Patent.   Patented Mar. 5, 1918.

Application filed August 6, 1915. Serial No. 44,004.

*To all whom it may concern:*

Be it known that I, MORRIS F. WEINRICH, a citizen of the United States, residing at New York city, in the county of New York and State of New York, have invented certain new and useful Improvements in Measuring Instruments, of which the following is a specification.

My invention relates to certain new and useful improvements in measuring instruments, such as voltmeters, ammeters, wattmeters, and the like, and my invention consists, essentially, in providing an instrument of the character above indicated with means for adjusting the torque or force so that a predetermined voltage—in the case of a voltmeter, for instance—is necessary to produce a torque or force great enough to balance the controlling torque or force and therefore bring the pointer with which the instrument is usually provided to a proper division on the scale of said instrument.

My invention further consists of the parts and the constructions, arrangements and combinations of parts substantially as I will hereinafter describe and claim.

In the accompanying drawings forming part of this specification and in which similar reference characters indicate like parts in the several views:—

Fig. 3 is an elevation of a measuring instrument of modified form embodying my invention.

Fig. 4 is a detail showing an enlarged view of dial gear, $g^1$, of Fig. 3.

Figure 1:
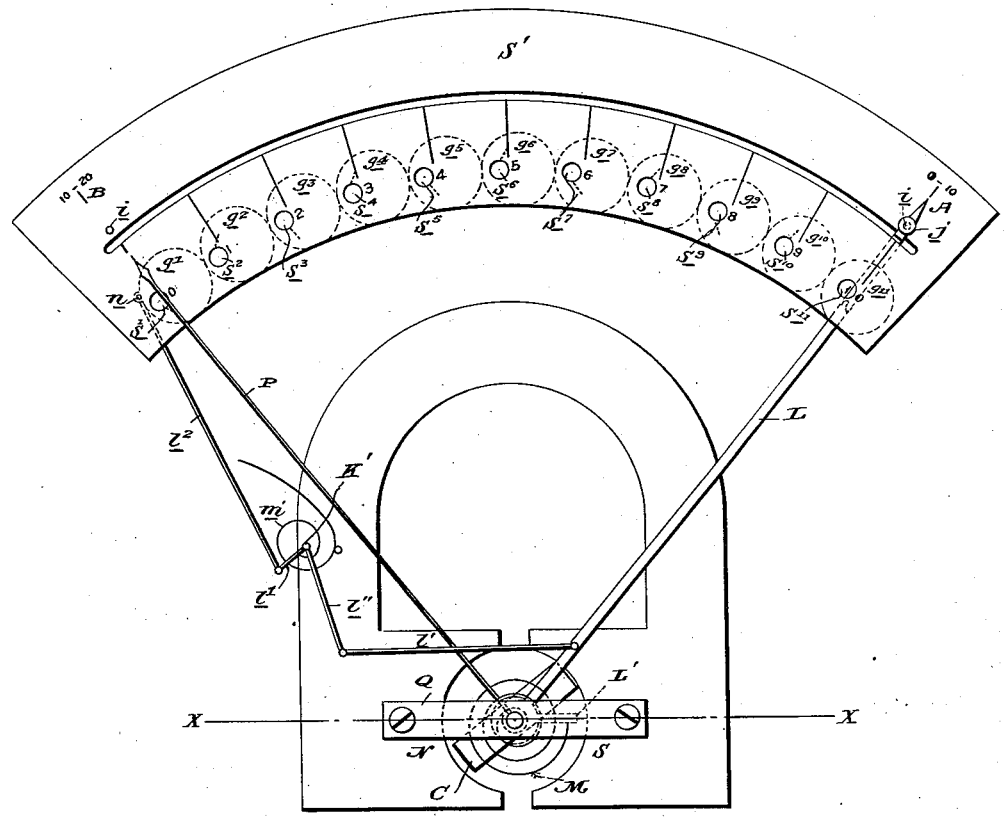
Figure 1 shows in elevation a measuring instrument embodying the salient features of my invention.
Figure 2:
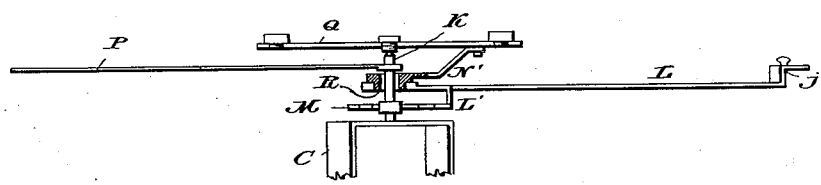
Fig. 2 is a sectional view on the line X—X of Fig. 1.

In the aforesaid drawings, Figs. 1 and 2, I have shown for illustrative purposes a well known type of voltmeter having the usual pole pieces, N—S, the coil, C, the controlling hair-spring, M, and the pointer, P, these parts being as usual in the construction of the instruments specified.

One end of the hair-spring, M, is, as usual, fixed to a collar on the spindle, K, of the usual coil, C, but the other end of said spring is fixed to an arm, L', of a lever, L, mounted to turn about a bearing, R, at the end of an arm, N', fixed to the support, Q. The lever, L, may, therefore, be turned about the bearing, R, concentrically with the spindle K.

The lever, L, and the pointer, P, operate in connection with a scale, S', through which sight apertures, $s^1$ $s^2$, $s^3$ etc., may be made for the exposure of readings on revoluble disks, which I will hereinafter more specifically refer to. When the voltmeter, the scale of the one shown being divided into ten parts, is used to read voltages from 0–10 the end of the lever which is slightly springy, is moved to the point, "A" marked 0–10, where it may be fixed by reason of a pin, $j$, on the lever snapping into engagement with a hole or recess, $i$, in the scale-plate, and the pointer, P, will be at 0. If used to read voltages of say 2, 8 and 10 volts, the pointer will indicate 2, 8 and 10 respectively, in Fig. 1.

If, however, it is desired to use the instrument to read voltages from 10–20, the lever, L, is pushed to "B" marked 10–20, and allowed to snap into place. This operation of the lever effects four important results, three of which will be apparent in Fig. 1. For instance, the arm, L', which is attached to the lever, L, will turn through the same angle as the lever, L, and will thereby tighten or increase the tension of the hair-spring M throwing the pointer, P, against a stop-spring, $m'$. The axis K' of this spring, $m'$, is connected to the lever, L, by means of the rod, $l'$ and arm, $l''$, (attached to the axis K',) through the medium of which the motion of the lever, L, is communicated to the stop-spring $m'$ winding it in such manner as to bring the pointer to rest gently when flying back upon the breaking of the circuit as higher and higher voltages are measured and the hair-spring, M, put under greater and greater strain.

On the back of the scale, S', a train of intermeshing dial gears, $g^1$, $g^2$, $g^3$, etc., is mounted, each of which gears is supplied with appropriate successive numbers, from 1 to whatever number may be required. The other function which is produced automatically by the aforesaid moving of the lever L, is the appearance of the proper numbers corresponding to the divisions on the scale as the lever is moved from A to B.

This is done by the arm, $l^1$, attached to the axis, K', and rod $l^2$, the latter being attached to the arm, $l^1$ and to the dial gear, $g'$, at $n$, and thus turning the wheels of the aforesaid train until the desired numbers thereof appear in register with the openings made in the scale. In Fig. 1, when the lever, L, is pushed to the position "B," the numerals 1 on the dial wheels, $g^1$ $g^{10}$ inclusive and the numeral "2" of the eleventh dial wheel $g^{11}$ will appear in register with the sight openings $s^1$ to $s^{11}$ inclusive. These numerals were invisible for the position "A" of the lever L.

When the instrument is used for a single range the arm, L′, is permanently adjusted to the proper position and the stop spring, $m'$, to the proper strain. The devices for winding the spring, $m'$, and shifting numbers and scale are then unnecessary and therefore may be omitted.

I have heretofore referred to the arm, L′, turning through the same angle as the lever, L, but manifestly this is not essential as the modified form of device shown in Fig. 3, shows. In this figure is disclosed a construction which enables the hair-spring, M, to be wound through a greater angle than that shown in Fig. 1, thereby increasing the range of the instrument. Fig. 3 also shows a means for straining the stop spring, $m'$, and shifting the scale and numbers. The device of Fig. 3 comprises in addition to the hair-spring, M, the coil, C, and support, Q, etc., of Fig. 1, a fine-cut gear wheel, $a$, revoluble about the bearing, R, concentric with the spindle, K, and carrying the arm, L′. Meshing with gearwheel, $a$, is a similar gear-wheel, $b$, on the axis of which is a knob, T, carrying a pointer, I, which operates over a suitable scale.

On the axis of the gear-wheel, $b$, is a fine-cut gear, $c$, which is in mesh with a similar gear-wheel, $d$, on whose axis is a fine-cut pinion, $e$, the teeth of which engage a rack, $f$, on a bar, G, to which the scale, S′, is fastened.

The bar, G, has a second rack, $g$, which engages a fine-cut pinion, $h$, which is designed to wind the stop-spring, $m'$.

In operating the device of Fig. 3, the knob is turned to bring the pointer to A, B, etc., on the scale, where it snaps into place. At the same time the fine-cut gear, $b$, which is fixed to the axis of the pointer, I, turns the gear, $a$, and thereby winds up the controlling hair-spring. The gear, $c$, which is also fixed to the axis of the pointer, operates the pinion, $e$, which is fixed to the gearwheel, $d$, and thereby moves the guided bar, G, to which the scale is fastened, outward by means of the rack, $f$. This outward movement of the bar is communicated through the pinion, $h$, to the stop-spring, thereby winding up the latter.

By means of a stationary rack, H, engaging with a gear attached to the numbering wheel, $g^6$, in the train of scale-gears, the numbers corresponding to the calibration lines are changed as the knob, T, is turned and the scale is shifted in the direction of the rack, H.

In Fig. 3 the train of gears is shown as including eleven fine-cut wheels, containing the arrangement of numbers shown in Fig. 4, the eleventh wheel starting with its initial number, 1, under or in register with its opening in the scale for the 0–10 position of the pointer I. As before mentioned the motion of the pointer, I, is communicated to the scale of the instrument by the bar, G, which shifts it outward in the direction of the line $o'$—$o''$, as the instrument is used to read higher voltages. This will bring different sections of the division marks under a straight part $p'$ of the pointer, P, thus enabling an adjustment in case of slight changes in the calibration for large ranges of voltage.

From the foregoing it will be understood that a leading object of the present invention is to construct an instrument of the character described so that it will read only in the region of the voltages for which it is to be used, say, 45–55, 50–60, 100–120, or any other desired range by adjusting the controlling torque or force so that a voltage of 45, 50, or 100 volts respectively is necessary to produce a torque or force great enough to balance the controlling torque or force and bring the pointer to the 45, 50 or 100 volt division respectively.

Secondly, to construct this instrument so that by means of a lever or other device the controlling torque or force may be adjusted so as to make it adapted to read any range of voltage, 0–10, 10–20, 20–30 . . . 110–120 or any other desired range. The device used to make this adjustment should at the same time by its position indicate the effective range.

Thirdly, any slight change in the scale for the different ranges may be compensated by curving the calibration lines and automatically shifting the scale under the pointer.

Fourthly, the adjusting device may automatically change the numbering of the scale by shifting the tens under openings in the scale.

Fifthly, the adjusting device may automatically change the strain in the stopping device at the lower end of the scale.

The advantages of instruments constructed in this way are very great, both for switch-board and testing or scientific purposes. The non-adjustable type for switch-board use would have the advantage over the usual type of the same size by being much more sensitive, i. e., having larger scale divisions, thereby enabling much closer control by making the slightest variation very noticeable. The adjustable type used for testing and scientific work offers the advantage of the great sensitiveness of a low reading instrument throughout the entire usual range of voltages.

The controlling of the strain in the hair-spring (a torque or force in general), by increasing or decreasing it through known and predetermined amounts, thereby requiring a known and predetermined voltage (in the case of a voltmeter), to bring the pointer to the first scale-division, is, as before explained, the essential feature of my invention. The automatically adjustable stop-spring, automatic changing of the numbers corresponding to the graduation lines, and automatic shifting of the scale, I consider of secondary importance. In practice, it may be found that a permanently adjusted stop-spring will do for the entire range of the instrument. The shifting of the scale may also not be necessary in many cases. All of these automatic adjustments will be unnecessary in case of a permanently adjusted instrument of but one range, as far as mechanical adjustment is concerned.

The electrical and magnetic principles of the instrument are of course well known and a voltmeter for instance reading from 100-120 volts may, by changing the resistance in series with the coil, be used to read voltages from 1.0-1.2, 10-12, 50-60, 200-240, or the like. In the case of an ammeter a change in the value of the shunt would bring about a similar change in range. It is, however, to be noted that the change of range by electrical means changes the meaning of a "scale-division" whereas in my invention the magnitude of the deflection for say 1 volt is constant, (but for a possible slight variation to be treated later,) throughout the entire range of the instrument which means that the instrument is just as sensitive between 100 and 120 as it is between 0 and 20 for whole scale deflection.

In Fig. 3, the scale plate is shown provided with the dotted line $a'$—$a''$, which indicates the path of the end, $p'$ of the pointer, P, when reading voltages from 0-10. The scale being automatically shifted outward in the direction of the line $o'$—$o''$, $b'$—$b''$ indicates the path of the pointer when reading from 110-120. These divisions may be a little smaller than the foregoing, the smallest being that from 119-120. The divisions in range 60-70 may be as indicated on line $c'$—$c''$. Intermediate divisions have corresponding intermediate sizes. The middle line $o'$—$o''$ is straight. The other lines may be broken or stepped as shown in case of line $e'$—$e''$. When the variation between successive scales is slight the line may be drawn as a continuous curve as shown in case of line $f'$—$f''$.

The provision for shifting the scale along the line $o'$—$o''$, i. e. parallel to it, is shown in detail in Fig. 3, heretofore explained.

My invention may be embodied in many other forms than those shown and described and I therefore do not wish to be restricted to the precise forms shown, but intend to cover by the following claims all changes and modifications within the scope of my invention.

Having thus described my invention what I claim as new and desire to secure by Letters Patent is:—

1. In an instrument of the character described, the combination of a controlling coil and a spindle therefor; a hair-spring and a pointer, attached to the spindle of the coil; a scale over which the pointer is operable; an arm mounted concentrically with the axis of the coil and spring and having one end of the spring connected to it, the other end of said spring being attached to the spindle of said coil; and a setting member, the motion of which, to a predetermined position, is communicated to said arm, the motion of the arm subjecting the hair-spring to predetermined strains thereby necessitating different predetermined currents to operate the controlling coil and pointer, and thus changing the range of the instrument by known amount by purely mechanical means, substantially as described.

2. In an instrument of the character described, the combination with a controlling coil and a spindle therefor, a hair-spring and a pointer attached to the spindle of the coil, and a scale over which the pointer is operable, of external means for enabling the user to adjust the torque or force of said spring to a predetermined value whereby a predetermined current through the controlling coil is necessary to produce a torque or force sufficient to balance the torque or force of the spring and bring the pointer to an initial division on said scale thereby doubling, trebling or in general multiplying the range of said instrument, a stop-spring in the path of return movement of the pointer and means for automatically adjusting the resistance of the stop-spring in proportion to the controlling torque or force of the hair-spring.

3. In an instrument of the character described, the combination with a controlling coil having a spindle a pointer and a hair-spring attached thereto, a scale over which the pointer is operable, external means enabling the user to adjust the torque or force of said spring to a predetermined value whereby a predetermined current through the controlling coil is necessary to produce a torque or force sufficient to balance the torque or force of the spring and bring the pointer to an initial division on the scale thereby doubling, trebling or in general multiplying the range of said instrument, said means comprising a setting-member and connections between the same and one end of the spring, the other end of the spring being attached to the spindle of the coil, a stop-spring in the path of return movement of the pointer, and means for automatically adjusting the resistance of the stop-spring in proportion to the controlling torque or force of the hair-spring.

4. In an instrument of the character described, the combination with a controlling coil having a spindle a pointer and a hair-spring attached thereto, a scale over which the pointer is operable, external means enabling the user to adjust the torque or force of said spring to a predetermined value whereby a predetermined current through the controlling coil is necessary to produce a torque or force sufficient to balance the torque or force of the spring and bring the pointer to an initial division on the scale thereby doubling, trebling or in general multiplying the range of said instrument, said means comprising an arm mounted concentrically with the axis of the coil and spring and having one end of the spring connected to it, the other end of the spring being attached to the spindle of said coil, a setting-member and connections between the same and said arm whereby the arm is moved in response to the movement of the setting-member to adjust the torque or force of the spring, a stop-spring in the path of return movement of the pointer, and means for automatically adjusting the resistance of the stop-spring in proportion to the controlling torque or force of the hair-spring.

5. In an instrument of the character described, the combination with a controlling coil having a spindle a pointer and a hair-spring attached thereto, a scale over which the pointer operates, said scale including a scale plate having openings and a series of dial wheels thereunder each adapted to be turned to bring successive numbers into register with one of said openings, of a setting-member, connections between said member and the hair-spring whereby the torque of said spring is determined by the position of the setting-member and a predetermined current through the controlling coil is necessary to produce a torque or force sufficient to balance the torque or force of the spring and bring the pointer to an initial division on said scale, a stop in the path of return movement of the pointer, and means for automatically adjusting the resistance of the stop in proportion to the controlling torque or force of the hair-spring.

6. In an instrument of the character described, the combination with a controlling coil having a spindle, a pointer and a hair-spring attached thereto, a scale including a scale-plate over which the pointer is operable and having openings and a series of dial wheels thereunder, each adapted to be turned to bring successive numbers into register with one of said openings, of a setting-member, an arm movable about the axis of the hair-spring and having one end of said spring attached to it, the other end of the spring being attached to the spindle of said coil, gearing between the setting-member and said arm whereby the torque of said spring is determined by the position of the setting-member, a bar to which the scale plate is fixed, said bar provided with a rack-surface, and gearing between the setting-member and the rack-surface on said bar for moving the bar longitudinally and thereby radially shifting the position of the scale-plate.

7. In an instrument of the character described, the combination with a controlling coil having a spindle, a pointer and a hair-spring attached thereto, a scale including a scale-plate over which the pointer is operable and having openings and a series of dial wheels thereunder, each adapted to be turned to bring successive numbers into register with one of said openings, of a setting-member, an arm movable about the axis of the hair-spring and having one end of said spring attached to it, the other end of the spring being attached to the spindle of the coil, gearing between the setting-member and said arm whereby the torque of said spring is determined by the position of the setting-member, a bar to which the scale-plate is fixed, said bar provided with a rack-surface, gearing between the setting-member and the rack-surface on said bar for moving the bar longitudinally and thereby radially shifting the position of the scale-plate, and means for imparting rotation to the series of dial wheels in unison with the movement of said bar and scale-plate.

8. In an instrument of the character described, the combination with a controlling coil having a spindle, a pointer and a hair-spring attached thereto, a scale including a scale-plate over which the pointer is operable and having openings and a series of dial wheels thereunder, each adapted to be turned to bring successive numbers into register with one of said openings, of a setting-member, an arm movable about the axis of the hair-spring and having one end of said spring attached to it, the other end of the spring being attached to the spindle of the coil, gearing between the setting-member and said arm whereby the torque of said spring is determined by the position of the setting-member, a bar to which the scale-plate is fixed, said bar provided with a rack-surface, gearing between the setting-member and the rack-surface on said bar for moving the bar longitudinally and thereby radially shifting the position of the scale-plate, means for imparting rotation to the series of dial wheels in unison with the movement of said bar and scale-plate, a stop-spring in the path of return movement of the pointer, and means for automatically adjusting the resistance of the stop-spring in proportion to the controlling torque or force of the hair-spring, said last-named means including a second rack-member on said movable bar and an engaging gear-wheel to which one end of the stop-spring is secured.

In testimony whereof I affix my signature.

MORRIS FRANCIS WEINRICH.